United States Patent [19]

Takigawa et al.

[11] Patent Number: 4,977,997
[45] Date of Patent: Dec. 18, 1990

[54] SYSTEM FOR TURNING SHAPE STEELS UPSIDE DOWN

[75] Inventors: Shogo Takigawa; Seiichi Yusa, both of Kakogawa; Eiji Futagi, Kobe, all of Japan

[73] Assignee: Takigawa Kogyo Co., Ltd., Kakogawa, Japan

[21] Appl. No.: 401,846

[22] Filed: Sep. 1, 1989

[51] Int. Cl.$^5$ .................................. B65G 47/24
[52] U.S. Cl. .................... 198/374; 198/410; 198/404
[58] Field of Search .............. 198/410, 404, 374; 414/788.2, 788.3, 791.4, 758, 759, 761, 763, 759, 768, 770, 775, 779–781

[56] References Cited

U.S. PATENT DOCUMENTS

| 3,042,226 | 7/1962 | Maciejczak | 198/410 X |
| 3,160,287 | 12/1964 | Hinchliffe | 198/410 X |
| 3,452,884 | 7/1969 | Tanqueray | 414/791.4 X |
| 3,957,163 | 5/1976 | Tanzler | 198/404 X |
| 4,278,377 | 7/1981 | Elineau | 414/791.4 X |
| 4,392,765 | 7/1983 | Barton et al. | 414/788.2 |
| 4,474,815 | 2/1978 | Varwig | 414/758 |
| 4,566,833 | 1/1986 | Giagante | 414/791.4 X |
| 4,648,770 | 3/1987 | Berz et al. | 198/374 X |

FOREIGN PATENT DOCUMENTS 62-27231  2/1987  Japan .

Primary Examiner—Joseph E. Valenza
Assistant Examiner—D. Glenn Dayoan
Attorney, Agent, or Firm—Birch, Stewart, Kolasch & Birch

[57] ABSTRACT

A system for turning shape steels upside down includes a conveyor adapted to transport shape steels along a line, a shifting device having bars rotatable across the line upwards and downwards for transferring the shape steels from a count-up station to a first tumbling station and at the same time from the first tumbling station to a second tumbling station, intermediate and final lifting devices disposed at the tumbling stations, respectively, such that they are raised and lowered alternately in unison with the shifting device, and in their raised positions cause the shape steels to turn upside down and magnetic means adapted to attract the inverted shape steels located on the final lifting device, so as to transfer them onto a pick-up station before they are delivered to a binding apparatus.

3 Claims, 5 Drawing Sheets

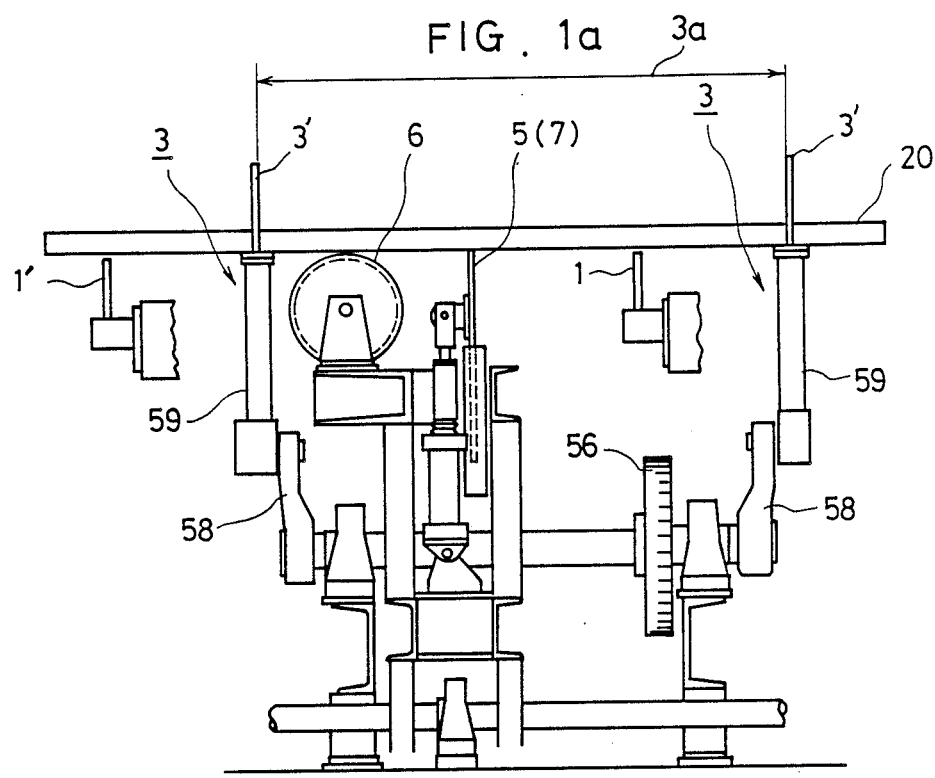

SYSTEM FOR TURNING SHAPE STEELS UPSIDE DOWN

BACKGROUND OF THE INVENTION

1. Field of the Invention

The invention relates to a system adapted to turn shape steels such as angle irons and channel steels upside down so that they are piled compact one on another before delivered to a binding apparatus in which they are bound up together into a bundle.

2. Descriptor of Prior Art

It is a common practice to pile and bind up such shape steels for easiness in the handling and commercial transportation thereof. The shape steels which are previously cut into pieces of a predetermined length have selectively to be turned upside down to enable compact piling thereof.

Therefore, a conveyor line leading to a gathering station is provided with a counting station as well as a turning station. Although a group of predetermined number of pieces pass through the turning station without being turned, the next successive group of the pieces are handled there so that each of them is turned upside down. These alternate operations are repeated until a predetermined number of shape steel pieces are gathered at the gathering station. The pieces thus gathered are then delivered to a binding apparatus.

There are known, for example, two systems which have been proposed to conduct the above-mentioned turning operation. According to one of the known systems, a swingable arm having a magnet is used as disclosed in Japanese Pat. Kokai Publication Sho. 62-27231. The other known system employs a lifting magnet which pushes shape steels on a conveyor upwards at their bottom surfaces. Said shape steels thus pushed will turn upside down while being attracted to the magnet.

However, in the former known system, the long swingable arm is swung a considerably long distance while carrying the heavy shape steels. This system, therefore, needs a higher power and brings about a higher running cost.

The latter known system mentioned above is disadvantageous in the handling of small-sized shape steels because it cannot be expected to smoothly operate in such case, despite its smooth operation in handling large-sized shaped steels.

In summary, it is difficult for the known systems to turn upside down the comparatively small-sized shape steels smoothly and economically.

SUMMARY OF THE INVENTION

It is therefore an object of the invention to provide a system in which even the small-sized shape steels can be caused exactly and effectively to turn upside down before they are delivered to a binding apparatus.

According to the invention, the system comprises: conveying means for transporting shape steels along a line extending from a count-up station to a pick-up station; shifting means for raising the shape steels from the count-up station and then lowering said steels onto a first tumbling station, and for raising at the same time the shape steels on the first tumbling station and then lowering said steels onto a second tumbling station; the shifting means having a bar extending over the count-up station and the first tumbling station in its first position and capable of being rotated by a crank mechanism such that the bar is maintained horizontal during its rotation towards its second position covering the first and second tumbling stations; intermediate lifting means liftable in situ, having a comb-shaped top surface and located at the first tumbling station; final lifting means also liftable in situ, having a zigzag top surface and located at the second tumbling station; and magnetic means for magnetically attracting the shape steels on the final lifting means so as to transfer said steels onto the pick-up station.

The system in the invention operated in such a manner that a first mode and a second mode take place alternately. In the first mode, the shifting means, the intermediate lifting means and the final lifting means remain stationary so that the shape steels advance along the line from the count-up station to the pick-up station, without being treated with by any of these means. The shape steels such as angle irons which have flanges perpendicular to each other are kept at their inverted state with tip ends of their flanges resting on the top surface of the conveying means.

However, during the second mode of operation, the shape steels are counted by an appropriate counter such as a photosensor on the line while being transported by the conveying means Due to a stopper disposed between the count-up station and the first tumbling station, the counted shape steels are held in a row on the count-up station until a predetermined number of steels have come therein. The steels in the row are arranged in a horizontal plane and in close contact with each other.

Upon receipt of the predetermined number of steels by the count-up station, the shifting means is driven to rotate the bar with its position kept horizontal. The rotation of the bar is such that it moves upwards across the line on which the conveying means is disposed, then moves forwards towards the second tumbling station so as to take its second position, further is lowered across said line and finally returns back to its first position while being maintained below said line.

At the same time as, or prior to, the activation of the shifting means, the intermediate and the final lifting means are raised in situ so that their comb-shaped surface and zigzag surface are positioned above the aforementioned line on which the conveying means is disposed The bar does not hinder the lifting means from being raised.

It will now be apparent that the shape steels on the count-up station are raised by the bar so as to be transferred forwards onto the comb-shaped surface of the intermediate lifting means, and simultaneously the steels which have been previously transferred to and then resting on the said comb-shaped surface are also raised by the bar and carried forwards onto the zigzag surface of the final lifting means.

Each of the shape steels which are being delivered from the bar to the comb-shaped surface of the intermediate lifting means collides at its trailing flange with each of teeth forming the comb-shaped surface Consequently, a leading flange of each shape steel falls down into a space defined between two neighboring teeth Thus, if the shape steels are angle irons, their appearance n side elevation changes from an "inverted V-shape" into an "L-shape" while rotating about 135°. If the shape steels are channel steels, their appearance in side elevation will change from "U-shape" into "C-shape" while rotating about 90°.

Further, each of the shape steel which are being delivered from the bar to the zigzag surface of the final lifting means collides at its trailing flange with a summit of a ridge formed on the zigzag surface. As a result, each leading flange of the steel falls down into each valley between the ridges so as to bear against a slope of the next ridge. Thus the angle irons will change their appearance from "L-shape" into "V-shape" while rotating about 45° where as the channel steels change their appearance from "C-shape" into "inverted U-shape" while rotating about 90° again.

The shape steels which have been turned twice, in the manner just described, to take their upside-down position are then lifted by the magnetic means, moved away and overlaid upon another row of shape steels which are lying on the pick-up station in their normal or unturned state. In such a pile of shape steels, they are stably engaged with each other as apparent from the drawings because the flanges of each steel respectively bear against the fanges of other steels. Such a stable pile is therefore easier to be transported from the pick-up station to the binding apparatus and also to be bound up into a bundle thereat.

The system provided by the invention for turning shape steels upside down makes it possible to handle at a time, a number of the small-sized shape steel and to turn them surely and efficiently. The system makes no use of any special apparatus but merely utilizes the gravitational fall of shape steels and the collision thereof with a simple member such as the comb-shaped or zigzag surface.

BRIEF DESCRIPTION OF THE DRAWINGS

The invention will become more apparent from the following description and the accompanying drawings, in which:

FIG. 1a is a front elevation of the embodiment;

DETAILED DESCRIPTION OF THE PREFERRED EMBODIMENTS

Figure 1:
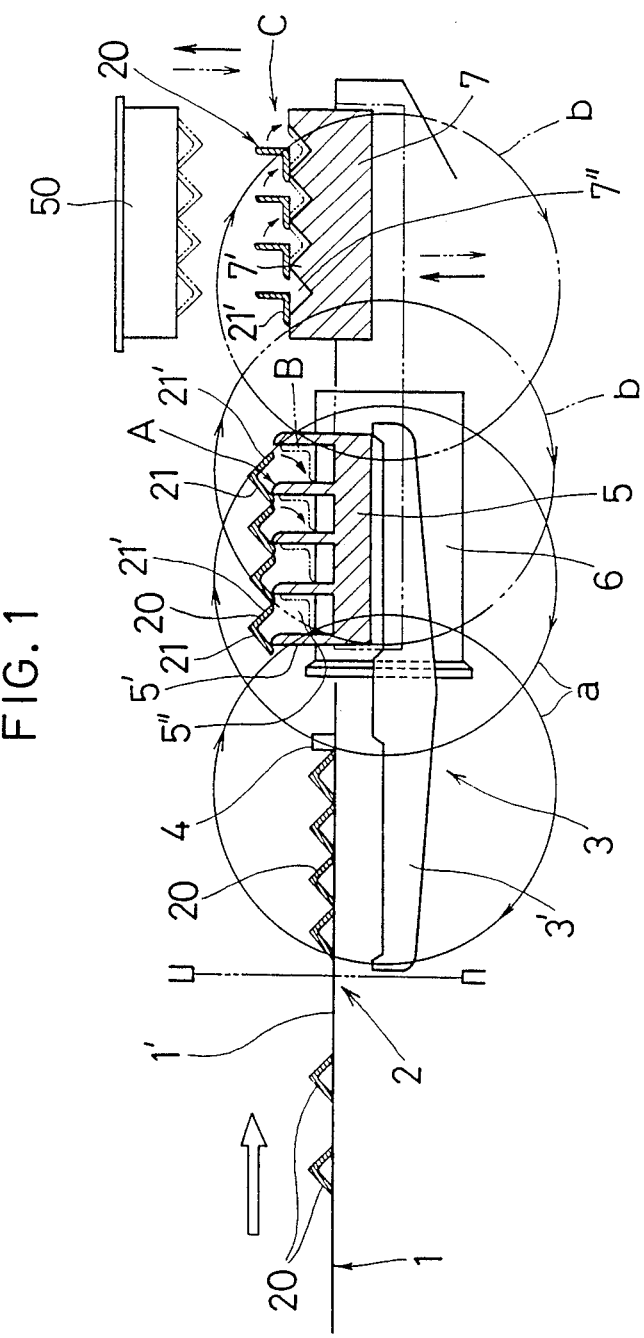
FIG. 1 is a side elevation which schematically shows an embodiment of the invention wherein angle irons are turned upside down.
Figure 2:
FIG. 2 illustrates a state of piled angle irons.

In a system according to an embodiment shown in FIGS. 1 and 2, angle irons 20 are handled. The angle irons 20 which have been cut into a predetermined length are fed one by one by a chain conveyor 1 as conveying means so as to pass by a photosensor 2.

A stopper 4 is disposed at a predetermined distance from the photosensor 2, the distance comprising a count-up station. A rear portion (left hand portion in the Drawings) of each bar 3' which constitutes shifting means 3 is located beneath the count-up station when and while said shifting means is stationary. The stopper 4 causes a predetermined number of the angle irons 20 to rest on the count-up station in such a compact state that said irons form a row.

Upon arrangement of the angle irons 20 into the said compact row, a crank mechanism causes bars 3' to rise across a line 1' on which an upper path of the chain conveyor 1 is disposed. The bars 3' rotate in such a manner that every portion thereof draws a locus of a predetermined radius, and are located adjacent to but apart from the chain conveyor 1. In a preferred structure of the system, two or more narrow bars 3' are disposed parallel with each other in a direction of the line 1'. A suitable space 3a is desirable between the bars 3', as shown in FIG. 1a.

Further, the bars 3' are maintained horizontal during their rotation so that the angle irons 20 aligned in a row are lifted taking their horizontal positions when the bars rise above the line 1'. Upon reaching at a highermost position, the bars 3' start to move forward (to the right, in the drawings) and downwards while rotating to draw locuses "a". As a result, each angle iron 20 advances forward a predetermined distance which is shorter a little than a diameter of the locuses "a".

Intermediate lifting means 5 having a comb-shaped top surface 5' is located at a first tumbling station which is adjacent to and in front (righthand, in the drawings) of the count-up station. The intermediate lifting means 5 is caused by a drive mechanism to rise in a vertical direction across the line 1' before the bars 3' start to move forward.

The comb-shaped top surface 5' comprise teeth which are erected upright on a main portion of the lifting means 5. Therefore, a lower portion of a trailing flange 21 of each angle iron abuts against each top end of the teeth as shown at "A" in FIG. 1. The bars 3' are further lowered to cause the angle irons 20 to fall into valleys or cavities 5" each defined between two adjacent teeth 5', due to gravitational force.

An aligning roller 6 employed in this embodiment is positioned near the first lifting means 5 in a side-by-side relation therewith. An upper peripheral surface is higher than bottoms of the cavities 5" so that the angle irons 20 rest on said peripheral surface Consequently, rotation of the roller 6 regulates lateral positions of said irons to thereby align lateral ends thereof with each other, with the aid of a stopper not shown. Thus, each of the angle irons 20 take its "L-shaped" position with its leading flange 21' lying on said peripheral surface of the roller 6, as shown at "B" in FIG. 1. This results from a rotation of each iron by about 135°.

It is to be noted here that the abovementioned process has to be conducted once before a regular and continuous operation begins. This means that the predetermined number of angle irons 20 have already been stored on the top surface of the intermediate lifting means 5 or on the roller 6 when the abovementioned process starts. Therefore, said one rotation of the bars 3 causes at the same time the transfer of the irons from the first tumbling station to a second tumbling station as described below.

Righthand (in the drawings) portions of the bars 3' moves upwards, forward and then downwards as shown by locuses "b" in FIG. 1. Thus, the angle irons 20 taking their "L-shaped" positions on the first tumbling station are raised, sent forward and then lowered onto the second tumbling station, which is located between the first tumbling station and a pick-up station 40.

End portions of or portions near ends of the horizontal (leading) flanges 21' collide at their rear portions respectively with summits of saw-teeth or ridges 7' forming a zigzag top surface of final lifting means 7 As the bars 3' are further lowered, gravitational force causes these irons 20 to rotate about 45° so as to fall into valleys or recesses 7". The angle irons 20 take their "V-shaped" positions as shown at "C" in FIG. 1.

Subsequently, magnetic means 50 is lowered and attracts thereto all the ends of flanges of said angle irons. The magnetic means 50 is raised thereafter and moved towards the pick-up station 40 so as to release the attracted irons onto the other angle irons which takes their "inverted V-shaped" positions, in such a manner as illustrated in FIG. 2.

Figure 3:
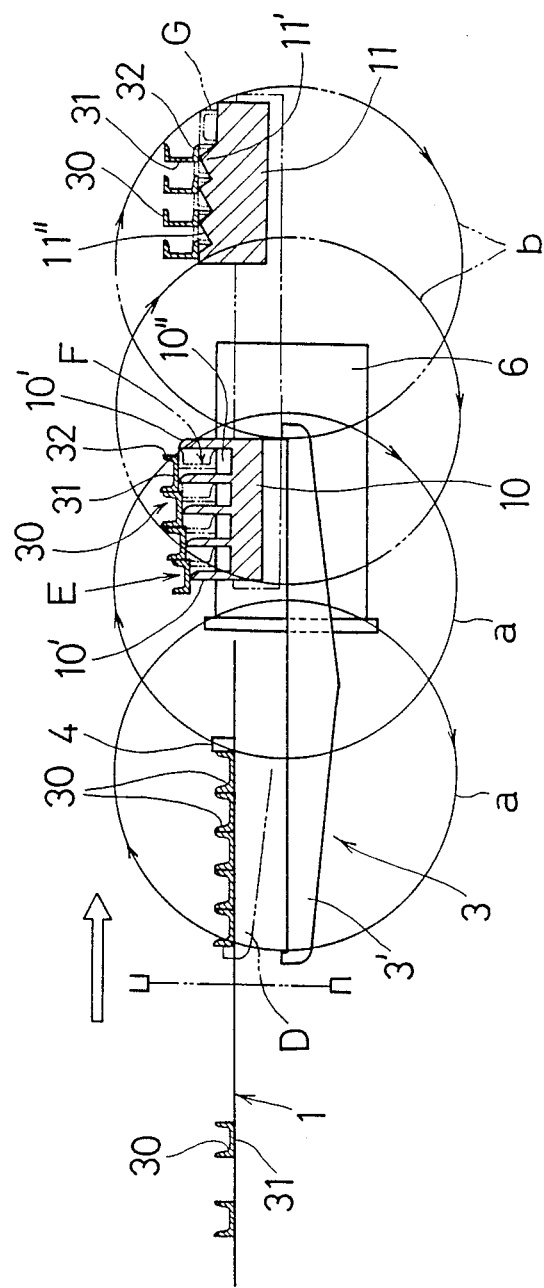
FIG. 3 schematically shows another embodiment wherein channel steels are turned upside down.
Figure 4:
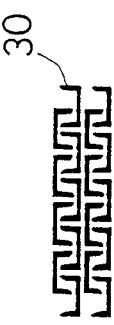
FIG. 4 illustrates a state of piled channel steels.

In another system according to another embodiment shown in FIGS. 3 and 4, channel steels 30 each having web 31 and flanges 32 extending therefrom are handled All the members employed in the first mentioned embodiment are also employed here with slight modifications made thereto. Therefore, only different features are explained below.

The channels 30 rest as shown at "D" in FIG. 3, on the count-up station with their webs 31 engaging the surface of chain conveyor 1. The comb-shaped surface of intermediate lifting means 10 comprises longer teeth 10' to define deeper and narrower cavities 10" so that said channels 30 may be tightly received therein. A portion located rearwardly of the center of gravity of each web 31 abuts as shown at "E", against a summit of each teeth 10', and thereafter the channels fall into the cavities 10" thereby changing their positions in side elevation from "U" shape to "C" shape as shown at "F" in FIG. 3.

The zigzag surface of final lifting means 11 is formed with ridges 11' of a non-isosceles triangle profile, thus providing recesses 11" of the same profile which is adapted to smoothly turn the channels upside down as shown in FIG. 4.

Figure 5:
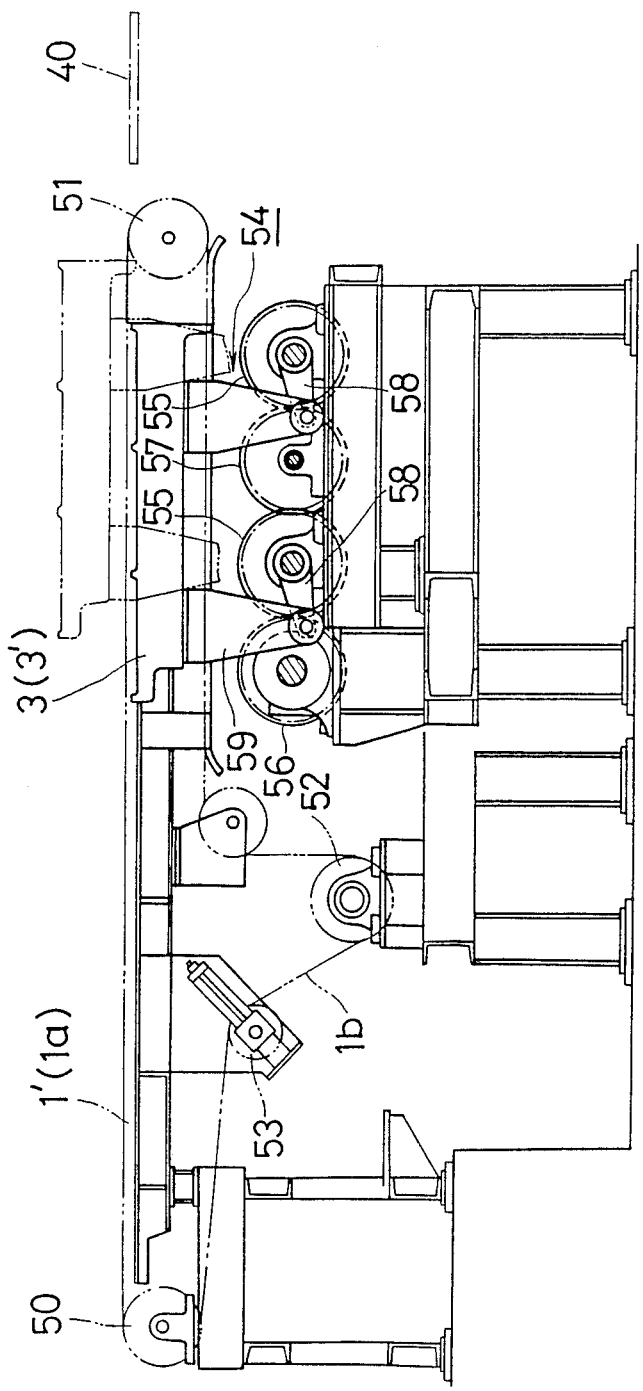
FIG. 5 is an enlarged side elevation of shifting means employed in both the embodiments.
Figure 6:
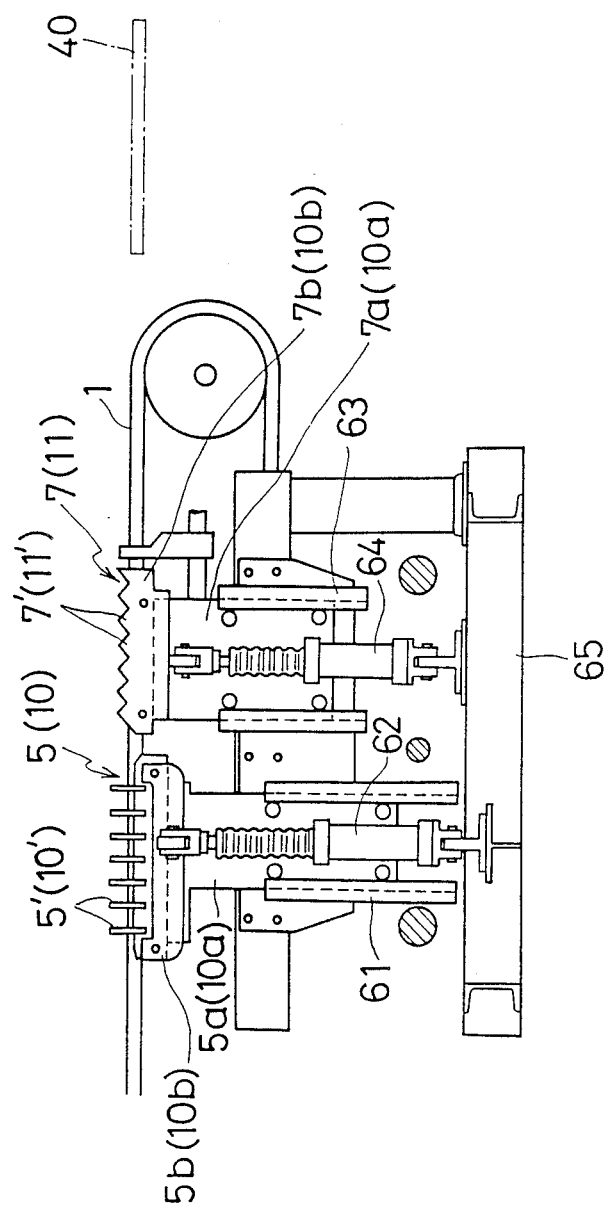
FIG. 6 is a further enlarged side elevation of intermediate lifting means and final lifting means employed in both the embodiments.

The chain conveyor 1 is located, as shown in FIGS. 5 and 6, so as to extend passing by the shifting means 3 (in FIG. 5), and by the intermediate lifting means 5(10) and the final lifting means 7(11) (FIG. 6).

The chain conveyor 1 is mounted between idler rollers 50 and 51, in order to form an upper path 1a and a lower path 1b. The upper path 1a provides the line 1'. The lower path 1b includes a drive roller 52 and a tension roller 53.

The crank mechanism 54 comprises driven rollers 55 which are driven directly by a drive roller 56 or indirectly through an idler 57. Crank arms 58 are rotated by the driver rollers 55 and pivotally connected with lower ends of legs 59 integral with the bars 3c.

The intermediate lifting means 5(10) has a vertical leg 5a(10a) which is guided by and between vertical guides 61 when the main portion 5b(10b) is driven by a pneumatic cylinder 62 in a vertical direction. The final lifting means 7(11) has likewise a vertical leg 7a(10a) which is guided by and between vertical guides 63 when the main portion 7b(10b) is driven by another pneumatic cylinder 64. The pneumatic cylinders 62 and 64 are fixed to a common bed 65.

What we claim is:

1. A system for turning shape steels upside down, the system comprising:
    conveying means for transporting shape steels along a line extending from a count-up station to a pick-up station.
    shifting means for raising the shape steels from the count-up station and then lowering said steels onto a first tumbling station, and for raising at the same time the shape steels on the first tumbling station and then lowering said steels onto a second tumbling station;
    the shifting means having a bar extending over the count-up station and the first tumbling station in a first position and capable of being rotated by a crank mechanism such that the bar is maintained horizontal during its rotation towards a second position covering the first and second tumbling stations;
    intermediate lifting means liftable in a vertical direction, having a comb-shaped top surface and located at the first tumbling station so as to receive and preliminarily tumble each of the shape steels;
    final lifting means also liftable in a vertical direction, having a zigzag top surface and located at the second tumbling station so as to receive and completely tumble each of the shape steels; and
    magnetic means for magnetically attracting the shape steels on the final lifting means so as to transfer said steels onto the pick-up station, wherein the shape steels are caused by the intermediate and final lifting means to turn upside down.

2. A system as defined in the claim 1 wherein the system is constructed so as to be operable alternately in a first mode and in a second mode; the shifting means, the intermediate lifting means and the final lifting means being kept during the first mode stationary and positioned below the line extending from the countup station to the pick-up station, so that the shape steels maintain their untumble states to be received by the pick-up station whereas during the second mode the shifting means is driven to rotate so as to carry the shape steels towards the intermediate lifting means and at the same time towards the final lifting means which means are raised above the line so that said shape steels are tumbled upside down before they are received by said pick-up station.

3. A system as defined in the claim 2 wherein the shape steels are those selected from a group consisting of angle irons and channel steels.

* * * * *